(12) United States Patent
Nakabayashi et al.

(10) Patent No.: US 6,404,968 B1
(45) Date of Patent: Jun. 11, 2002

(54) OPTICAL WAVEGUIDE ELEMENTS AND A PROCESS FOR PRODUCING THE SAME

(75) Inventors: Yukinobu Nakabayashi; Mitsuhiro Kitamura, both of Tokyo; Tatsuo Kawaguchi, Motosu-Gun; Jungo Kondo, Nishikamo-Gun; Minoru Imaeda, Nagoya, all of (JP)

(73) Assignees: NEC Corporation, Tokyo; NGK Insulators, Ltd., Nagoya, both of (JP)

( * ) Notice: Subject to any disclaimer, the term of this patent is extended or adjusted under 35 U.S.C. 154(b) by 0 days.

(21) Appl. No.: 09/519,701

(22) Filed: Mar. 7, 2000

(30) Foreign Application Priority Data

Mar. 18, 1999 (JP) .............................................. 11-073706

(51) Int. Cl.⁷ ................................................ G02B 6/10
(52) U.S. Cl. ........................................ 385/132; 385/129
(58) Field of Search ................................... 385/129–132

(56) References Cited

U.S. PATENT DOCUMENTS 4,778,234 A * 10/1988 Papuchon et al. ........... 385/132
5,612,086 A * 3/1997 Hakogi et al. ............ 427/163.2
5,866,200 A 2/1999 Yoshino et al. .......... 427/163.2
5,991,067 A 11/1999 Minakata et al. ............ 359/332

\* cited by examiner

*Primary Examiner*—John D. Lee
(74) *Attorney, Agent, or Firm*—Burr & Brown

(57) ABSTRACT

A process for producing an optical waveguide element by thermally diffusing a metal element or a metallic compound into a substrate having a photoelectric effect, includes the steps of: forming a waveguide pattern on the substrate, the waveguide pattern includes a metal element or metallic compound; forming a film on a main plane of the substrate that covers the entire waveguide pattern, the film having an electro-optic effect; and effecting the thermal diffusion of the metallic element or the metallic compound.

8 Claims, 4 Drawing Sheets

△ ···Dependency upon polarization light
□ ···Curved excess loss of TM mode
◇ ···Curved excess loss of TE mode

OPTICAL WAVEGUIDE ELEMENTS AND A PROCESS FOR PRODUCING THE SAME

BACKGROUND OF THE INVENTION

1. Field of the Invention

The present invention relates to optical waveguide elements and a process for producing the same. More particularly, the invention relates to optical waveguide elements which may be favorably used, for example, as curved optical waveguide elements for optical modulators, optical wavelength converters, optical splitters, optical switches, etc., as well as to the process for producing such optical waveguide elements.

2. Related Art Statement

Recently, optical waveguide elements have been used for optical modulators, optical wavelength converters, optical splitters, optical switches, etc.

Such an optical waveguide: element is formed by thermally diffusing a doping material into a base material to vary a refractive index thereof, for instance according to a titanium diffusion method.

FIGS. 1(a) and 1(b) are sectional views illustrating a method for producing an optical waveguide element by diffusing titanium into lithium niobate as generally used.

As shown in FIG. 1(a), after a waveguide pattern 2 made of a titanium is formed on a substrate having an electro-optic effect by vapor deposition, an optical waveguide 3 is formed as shown in FIG. 1(b) by thermally dispersing the above titanium into the substrate 1 through heating the substrate 1 up to a given temperature.

However, when the optical waveguide is formed in this way, it has a semi-elliptical sectional shape.

An actual optical fiber to be connected to such an optical waveguide element has a concentric sectional shape of a mode pattern with that of the optical waveguide element. Therefore, when an optical waveguide device is actually used in the state that the optical fiber is connected to the optical waveguide 3 having the semi-elliptical sectional shape as shown in FIG. 1(b), the coupling efficiency between the waveguide and the optical fiber decrease and the light transmission loss increases due to mode mismatching.

The optical waveguides formed according to the conventional producing processes are in contact with air or materials having refractive indexes lower than that of substrates such as quartz at upper faces thereof. Therefore, surface-polishing techniques yielding highly polished surfaces were required to reduce the scattering loss caused by the surface roughness of the substrate materials.

Attempts have been made to form curved optical waveguides as the above optical waveguides to improve integrality of the above optical devices (to decrease the length of the devices). However, if such an optical waveguide is formed as mentioned above according to the conventional titanium diffusion method, the vertical asymmetry of the mode of the light propagating inside the optical waveguide is large. Therefore, the curved excess loss increases, and the light transmission loss becomes extremely large, so that the optical device having fully high integrality cannot be formed.

Further, curved excess loss increases have a large dependency upon polarization of light owing to the above asymmetry. Since the dependency of this loss upon the polarization of light in the optical devices causes deviations in the device-insertion loss owing to deviations in the polarization of light of the incident light, it is desirable to reduce such dependency as much as possible.

SUMMARY OF THE INVENTION

The present invention relates to an optical waveguide element and a process for producing the same, which can reduce the light propagation loss and dependency of the light propagation loss upon polarization of light.

The present invention relates to the process for producing an optical waveguide element by thermally diffusing a metal element or a metallic compound into a substrate having a photoelectric effect, comprising the steps of: forming a waveguide pattern on the substrate, said waveguide pattern comprising the metal element or the metallic compound; forming a film on a main plane of the substrate and covering the entire waveguide pattern, the film having an electro-optic effect; and effecting the thermal diffusion of the metallic element and the metallic compound into the substrate.

The present invention also relates to the optical waveguide-buried type element, comprising a substrate having an optoelectrical effect, and an optical waveguide formed by thermally diffusing a metal element or a metal compound, wherein a diffused concentration of the metal element or the metal compound is substantially symmetrical in vertical directions within a section of the optical waveguide and also substantially symmetrical in lateral directions from a center of the section of the optical waveguide, and the diffused concentration of the metal or the metallic compound decreases radially outwardly from the diffusion source as viewed from the center of the section of the optical waveguide.

The present invention will be appreciated upon reading the following description of the invention :when taken in conjunction with the attached drawings, with the understanding that some modifications, variations and changes may be made by the skilled person in the art to which the invention pertains.

BRIEF DESCRIPTION OF THE DRAWINGS

For a better understanding of the invention, reference is made to the attached drawings, wherein.

DETAILED DESCRIPTION OF THE INVENTION

Figure 2A:
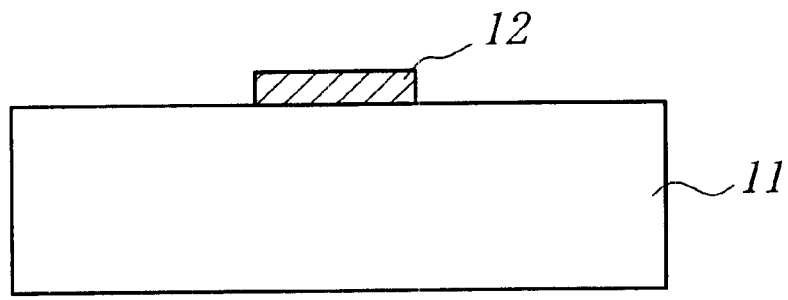
FIGS. 2(a) to 2(c) are sectional views illustrating the process for producing an optical waveguide element according to the present invention.
Figure 2B:
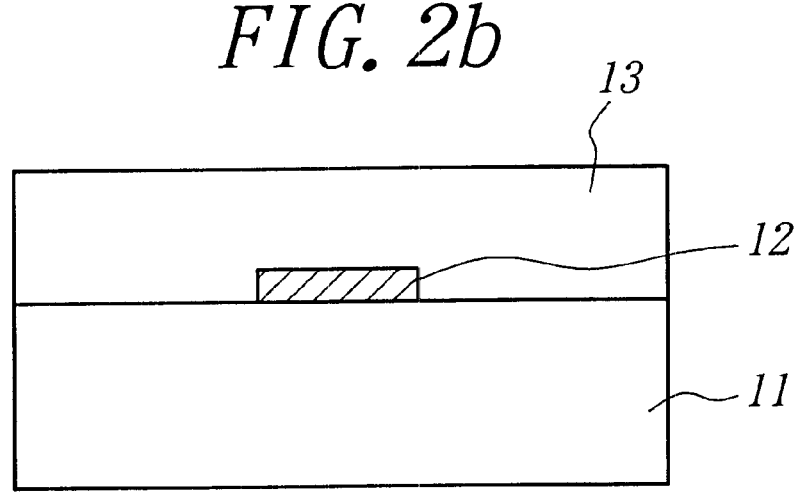
Figure 2C:
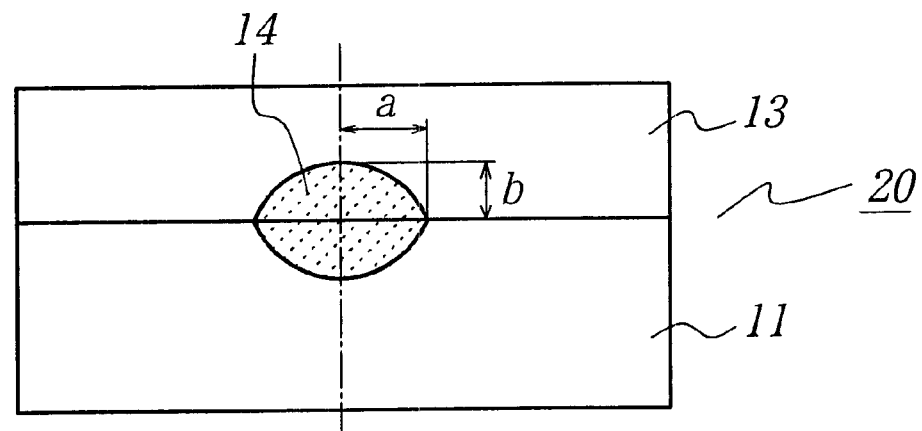

FIG. 2(a) to FIG. 2(c) illustrates a process for producing the optical waveguide element according to the present invention in section. In FIG. 2, constituent parts are depicted in a manner different from a dimensional relationship of the actual optical waveguide element.

As shown in FIG. 2(a), for example, a waveguide pattern 12 is formed from a metal such as titanium or a metallic compound on a substrate 11 having an electro-optic effect, made of such as a ferroelectric single crystal by vapor deposition. Then, as shown in FIG. 2(b), a film 13 having an electro-optic effect, for example made of such as the same material as that of the substrate 11 is formed on the substrate 11 by a liquid epitaxial method to cover the above waveguide pattern 12.

Thereafter, the entire substrate 11 is heated to a given temperature and the substrate is kept there for a given period of time, so that the metal such as titanium or the metal element of the metallic compound constituting the waveguide pattern 12 is dispersed into the film 13 and the substrate at a constant diffusing speed to form an optical waveguide 14 having a sectional shape as shown in FIG. 2(c).

Figure 1A:
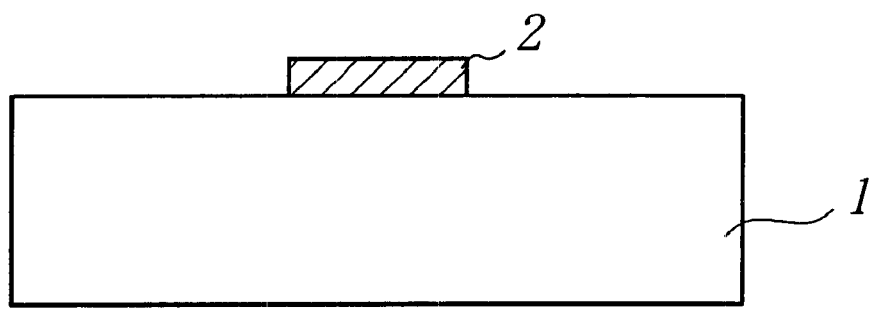
FIGS. 1(a) and 1(b) are sectional views illustrating the process for producing the optical waveguide element by the conventional titanium diffusion method.
Figure 1B:
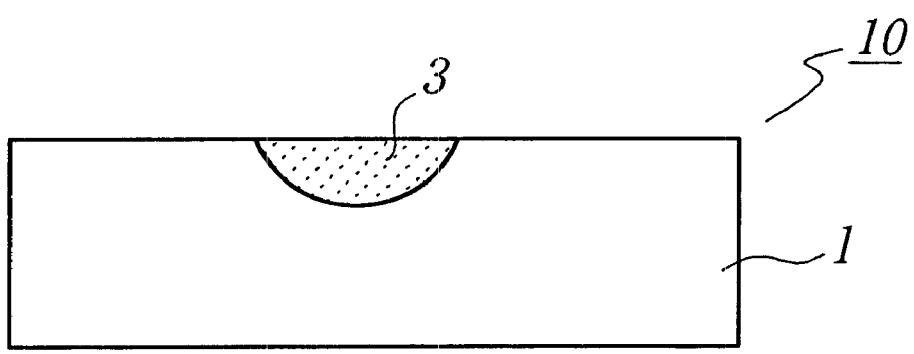

According to the optical waveguide element-producing process of the present invention, as mentioned above, the metal is thermally diffused into not only the substrate but also the film, because the film having the electro-optic effect is formed on the substrate before the metal such as titanium is thermally diffused, and then the metal is thermally diffused. Therefore, the thus obtained electro-optic has not an elliptical shape as shown in FIG. 1(b) but a shape as shown in FIG. 2(c) in which as shown in FIG. 2(c), the optical waveguide spreads in vertical directions, the diffused concentration of the metal is substantially symmetrical in vertical directions within a section of the optical waveguide and also substantially symmetrical in lateral directions of the center of a section of the optical waveguide, and the diffused concentration of the metal as the location goes radially outwardly from the diffusion source as viewed from the center of the section of the optical waveguide.

Therefore, when the optical waveguide element having such an optical waveguide is connected with an optical fiber, the optical waveguide element obtained according to the producing process of the present invention can improve coupling efficiency and reduce the coupling loss with respect to the optical fiber, because the sectional shape of the optical waveguide approaches a mode pattern of the optical fiber.

In addition, since the symmetry of the mode of the light propagating in the optical waveguide is enhanced, the curved excess loss and the dependency upon the polarization of light thereof can be reduced.

Further, the scattering loss of the optical waveguide thus formed is reduced, because scratches at the substrate and at the metallic pattern shorter than a thermally diffusing distance are smoothed during the formation of a refractive index profile by the thermal diffusion.

In the following, the present invention will be explained in detail with reference to specific embodiments in connection with the attached drawings.

According to the optical waveguide element-producing process of the present invention, it is necessary that a waveguide pattern 12 made of a metal such as titanium or a metallic compound is formed on a substrate 11, and then a film 13 having an electro-optic effect is formed on the substrate before the metal or the like constituting this waveguide pattern 12 is thermally diffused into the substrate 11.

If the metal or the like constituting the waveguide pattern 12 is thermally diffused into the substrate before the film 13 is formed, the metal diffuses into the substrate 11 alone. Consequently, the optical waveguide obtained exhibits a semi-elliptical sectional shape, so that the object of the present invention cannot be accomplished.

Further, it is necessary to form the film 13 having the electro-optic effect in such a manner that the film 13 may cover the entire waveguide pattern 12. If the waveguide pattern 12 is nowhere covered with such a film 13 or partially is covered with no film, the metal or the like cannot uniformly diffuse into the film 13. Consequently, an optical waveguide 14 having a section extended upwardly and downwardly as shown in FIG. 2(c) cannot be obtained.

In the present invention, it is preferable that both of the substrate having the electro-optic effect and the film 13 having this effect are made of the same material. In this case, when the metal or the like constituting the waveguide pattern 12 thermally diffuses, its diffusing speed in the substrate 11 is equal to that in the film 13, the optical waveguide 14 having a section being symmetrical in the vertical directions can be obtained as shown in FIG. 2(c).

In order to more effectively reduce the mismatching between the optical fiber as aimed at by the present invention, the thus obtained optical waveguide 14 having a widthwise spread sectional shape has a ratio a/b of preferably 1 to 10, more preferably 1 to 2 in which "a" and "b" are a major axis and a minor axis of the section of the optical waveguide, respectively.

Any material, which may be used for the substrate 11 in the present invention, is not limited to a specific one, so long as the material has an electro-optic effect. For example, ferroelectric single crystals such as lithium niobate ($LiNbO_3$) and lithium tantalum ($LiTaO_3$) may be recited.

Further, the metallic element or the element in the metallic compound constituting the waveguide pattern 12 is not limited to any particular ones, so long as it can stably form an optical waveguide through diffusing into the substrate 11 and forming a compound having a refractory index greater than that of the material constituting the substrate 11. Specifically, as the metal element, titanium, copper, zinc and chromium may be recited. As the metallic compound, oxides of the above metal elements may be recited.

Further, the film 13 is not particularly limited to a specific one, so long as the film has the electro-optic effect as in the case of the substrate 11. The same material as that of the substrate 11 may be used for the film 13. Further, as mentioned above, if the same material as that of the substrate 11 is used for the film 13, the optical waveguide 14 having a vertically symmetrical sectional shape as shown in FIG. 2(c) can be obtained.

The formation of the waveguide pattern 12 is not particularly limited to a specific one, and the pattern may be formed by using an arbitrary method. The waveguide pattern 12 is generally formed as follows.

After a substrate is coated with a photoresist by a spin coater, a photoresist mask is formed in conformity with the waveguide pattern 12 by using a photolithographic technique and etching technique.

Then, after a metal such as titanium or a metallic compound such as titanium oxide is heaped onto the substrate 11 through the above mask by vapor deposition, sputtering, ion plating and CVD, the waveguide pattern 12 as shown in FIG. 2(a) is obtained by dissolving out the mask with a solvent such as acetone.

The formation of the film 13 having the electro-optic effect is not particularly limited to any method, but an arbitrary method may be employed depending upon properties of a material to be used for the film 13. However, if the film 13 is made of a ferroelectric single crystal, a liquid phase epitaxial method is preferably used, because a uniform and relatively thick film as shown in FIG. 2(b) can be readily formed in a short time.

In order to thermally diffuse the metal or the like constituting the waveguide pattern 12 into the substrate 11 and the film 13, the substrate on which the waveguide pattern 12 and the film 13 are formed as shown in FIG. 2(b) is placed in a high-temperature electric furnace, for example, and heated at preferably 600 to 1200° C., more preferably 900 to 1000° C. for preferably 1 to 100 hours, more preferably 3 to 10 hours.

On the other hand, if the film 13 is formed from a ferroelectric single crystal by the liquid phase epitaxial method, the substrate 11 is heated to around 700 to 1000° C. during the formation of the film 13. Therefore, when the substrate is held for a given time period in a liquid phase epitaxial apparatus after the formation of the film 13, the metal or the like constituting the waveguide pattern 12 can be further thermally diffused. Therefore, this can remarkably simplify the steps of producing the optical waveguide element.

EXAMPLES

In the following, the present invention will be more concretely explained based on Examples in connection with the drawings.

Example 1

X-cut lithium niobate was used as a substrate, a photoresist mask was formed on the substrate by the method mentioned above, titanium was deposited on the substrate via this mask, and a waveguide pattern 12 having a width of 6 $\mu$m and a thickness of 0.25 $\mu$m as shown in FIG. 2(a) was formed.

Then, a film of lithium niobate single crystal was formed in a thickness of 20 $\mu$m at a film-forming temperature of 900° C. by the liquid phase epitaxial method.

Observation of the resulting assembly in section with a metallurgical microscope at this point of time revealed that the waveguide made of titanium maintained its rectangular sectional shape, and that the assembly had a structure as shown in FIG. 2(b). That is, it was revealed that titanium constituting the waveguide pattern 12 was not thermally diffused into the substrate 11 and the film 13 at the point of time when the film 13 was formed by the liquid phase epitaxial method.

Thereafter, the titanium was thermally diffused into the substrate 11 and the film 13 by placing the assembly in a high-temperature electric furnace and heating it at 1000° C. for 10 hours.

Observation of the thus obtained optical waveguide element in section with the metallurgical microscope in the same manner as above revealed that the optical waveguide 14 had a sectional shape as shown in FIG. 2(c) which was symmetrical in vertical directions. Actual measurement of dimensions of the optical waveguide 14 with the microscope revealed that the optical waveguide had an elliptical sectional shape laterally wide at a ratio a/b of 1.5 with "a" and "b" being a major axis and a minor axis, respectively.

A propagation loss due to scattering, etc. was 0.1 dB/cm, and a fiber-coupling loss was 0.4 dB, including a Fresnel loss.

Example 2

A plurality of optical waveguide elements having respective optical waveguides with different radii of curvature were formed in the same producing process as in Example 1.

Figure 3:
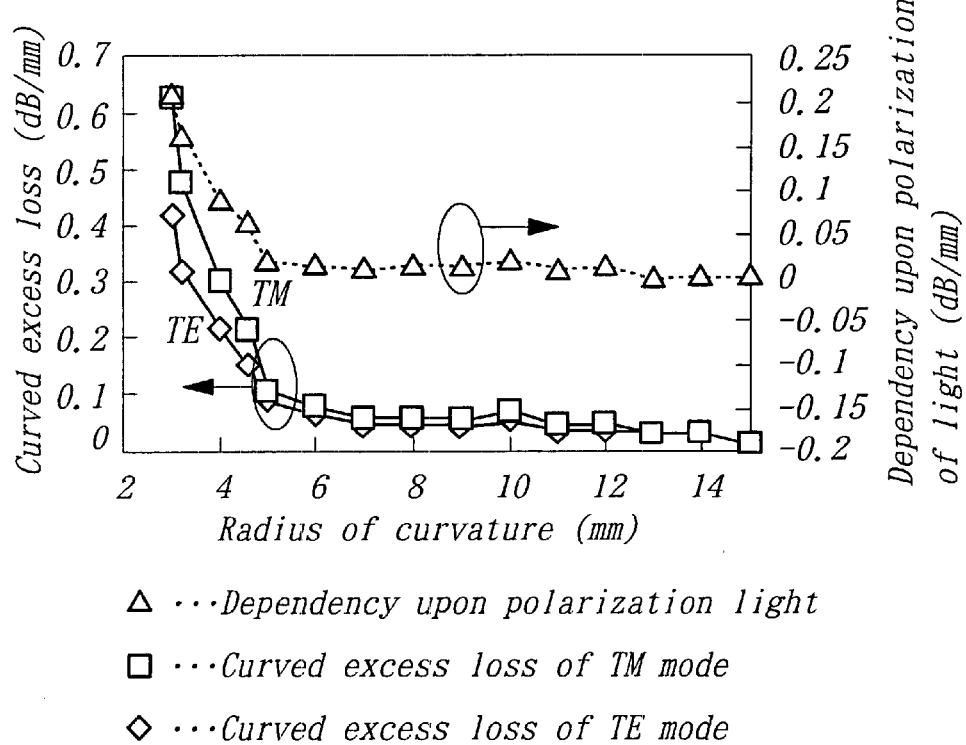
FIG. 3 is a diagram showing the curved excess losses of optical waveguide elements according to the present invention by way of examples.

After each of these optical waveguide elements was connected to an optical fiber, and light waves having a wavelength of 1.55 $\mu$m were led to the optical fiber, and a curved excess loss of the optical waveguide element was measured, which revealed that as shown in FIG. 3, a minimum allowable radius of curvature to give the excess loss of not more than 0.1 dB/cm was about 5 mm for both a TE mode and a TM mode. The dependency of the loss upon the polarization of the light was 0.01 dB/mm or less as a measurable limit at the radius of curvature of mot less than 7 mm.

Comparative Example 1

An optical waveguide element was formed in the same manner as in Example 1 except that a film 13 made of a single crystal of lithium niobate was not formed.

Observation of the thus obtained optical waveguide element in section with the metallurgical microscope in the same manner as above revealed that the optical waveguide had the same elliptical sectional shape as that of the optical waveguide 3 as shown in FIG. 1(b).

The propagation loss was 0.2 dB/cm, and the fiber-coupling loss was 0.9 dB, including a Fresnel loss.

Comparative Example 2

A plurality of optical waveguide elements having respective optical waveguides with different radii of curvature were formed in the same producing process as in Comparative Example 1.

Figure 4:
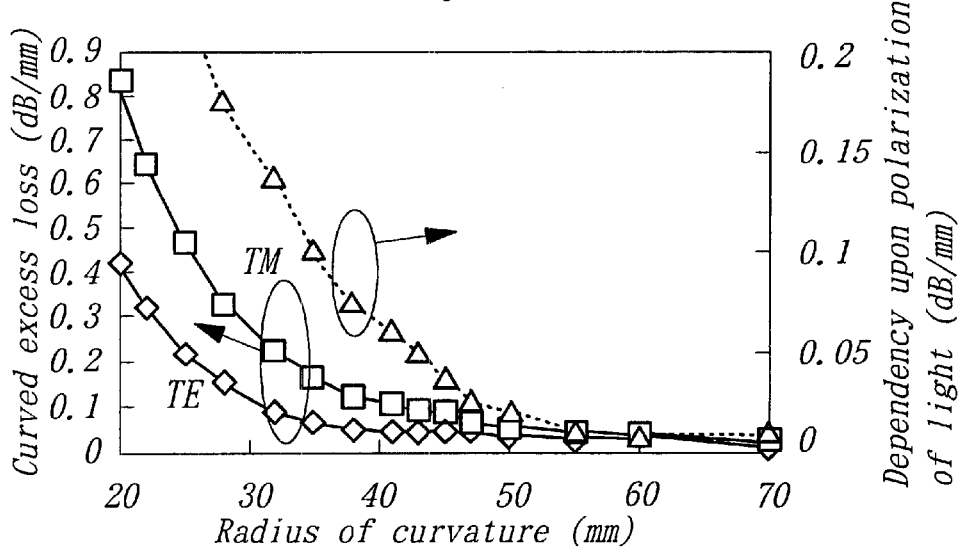
FIG. 4 is a diagram showing the curved excess losses of conventional waveguide elements by way of example.

After each of these optical waveguide elements was connected to an optical fiber, and light waves having a wavelength of 1.55 $\mu$m were led to the optical fiber, and a curved excess loss of the optical waveguide element was measured, which revealed that as shown in FIG. 4, a minimum allowable radius of curvature to give the excess loss of not more than 0.1 dB/cm was 32 mm for a TE mode and 32 for a TM mode. The dependency of the loss upon the polarization of the light was 0.01 dB/mm or less as a measurable limit at the radius of curvature of not less than 55 mm.

Comparative Example 3

An optical waveguide element was formed in the same manner as in Example 1 except that the order of the formation of a film 13 and thermal diffusion of titanium was reversed, and that after titanium was thermally diffused into a substrate 11 under the same condition as in Example 1, the film 13 was formed under the same condition as in Example 1 by the liquid phase epitaxial method.

Observation of the thus obtained optical waveguide element in section with the metallurgical microscope in the same manner as above revealed that the optical waveguide had the same elliptical sectional shape as that of the optical waveguide 3 as shown in FIG. 1(b). The propagation loss was 0.2 dB/cm, and the fiber-coupling loss was 0.6 dB, including a Fresnel loss.

Comparative Example 4

A plurality of optical waveguide elements having respective optical waveguides with different radii of curvature were formed in the same producing process as in Comparative Example 3.

Figure 5:
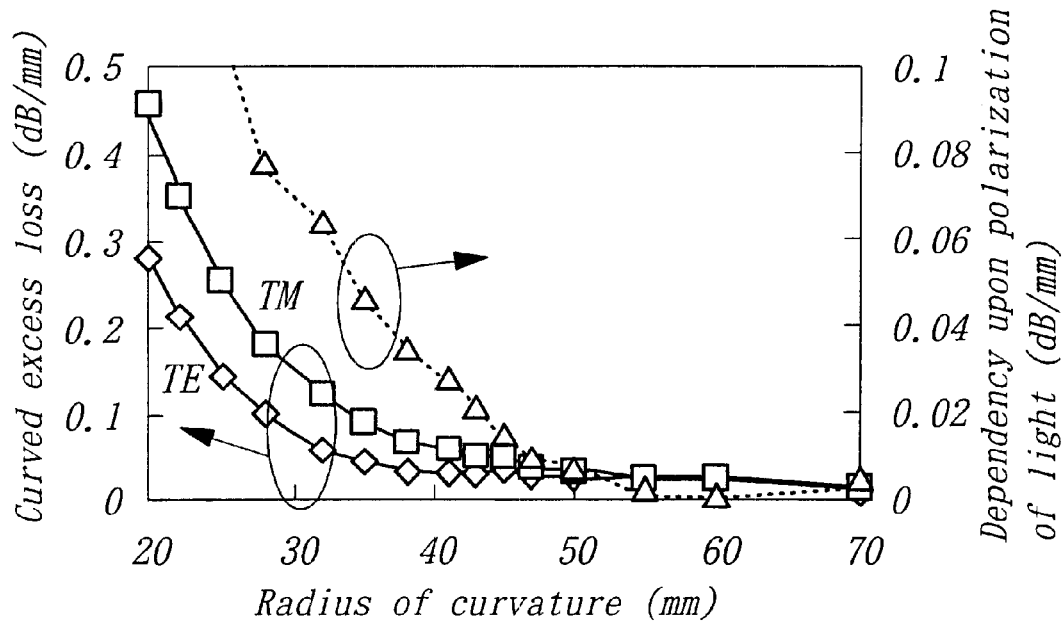
FIG. 5 is a diagram showing; the curved excess losses of conventional waveguide elements by way of other example.

After each of these optical waveguide elements was connected to an optical fiber, and light waves having a wavelength of 1.55 μm were led to the optical fiber, and a curved excess loss of the optical waveguide element was measured, which revealed that as shown in FIG. 5, a minimum allowable radius of curvature to give the excess loss of not more than 0.1 dB/cm was 28 mm for a TE mode and 47 for a TM mode. The dependency of the loss upon the polarization of the light was 0.01 dB/mm or less as a measurable limit at the radius of curvature of not less than 47 mm.

As mentioned above, as is clear from Example 1, Comparative Example 1 and Comparative Example 3, the optical waveguides of the optical waveguide elements obtained by the producing process of the present invention have elliptical sectional shapes which are vertically symmetrical.

As is clear from Example 2, and Comparative Examples 2 and 4, that optical waveguide element obtained by the producing process of the present invention which has the sectional shape as shown in FIG. 2(c) exhibits excellent mode-matching with the optical fiber, and the curved excess loss of the element and the dependency upon the polarization of light thereof can be reduced, even when the producing process is applied to the curved waveguide and the radius of curvature of the optical waveguide is reduced.

As mentioned above, although the present invention has been explained in detail with respect to the specific embodiments of the invention by reciting the concrete examples, the present invention is not limited to the above explanation. Any variations and changes may be effected without failing outside the scope of the present invention.

As having been explained in the above, according to the optical waveguide element and the process for producing the same in the present invention, the optical waveguide element having the optical waveguide with the sectional shape symmetrical in the vertical directions and also symmetrical in right and left directions relative to the center as viewed in section can be obtained. Therefore, the optical device having excellent matching with the optical fiber as well as high coupling efficiency can be obtained.

Owing to this, increase in the curved excess loss can be reduced, even when the optical waveguide element and the producing process thereof are applied to the curved optical waveguides and the radius of curvature thereof are reduced. As a result, the optical waveguide element which can enhance the integrality of the device and gives smaller variations in the device-insertion loss against deviations in the incident light polarization of light can be obtained.

What is claimed is:

1. A process for producing an optical waveguide element by thermally diffusing a metal element or a metallic compound into a substrate having a photoelectric effect, comprising the steps of: forming a waveguide pattern on the substrate, said waveguide pattern comprising the metal element or the metallic compound; forming a film on a main plane of the substrate and covering the entire waveguide pattern, the film having an electro-optic effect; and effecting the thermal diffusion of the metallic element or the metallic compound.

2. The optical waveguide element-producing process set forth in claim 1, wherein the substrate and the film each having the electro-optic effect comprise an identical material.

3. The optical waveguide element-producing process set forth in claim 2, wherein the film having the electrooptic effect comprises a ferroelectric single crystal.

4. The optical waveguide element-producing process set forth in claim 1, wherein the film having the electro-optic effect comprises a ferroelectric single crystal.

5. The optical waveguide element-producing process set forth in claim 4, wherein the film having the electro-optic effect is formed by a liquid phase epitaxial method.

6. The optical waveguide element-producing process set forth in claim 5, wherein the metal element or the metallic compound is thermally diffused into the substrate simultaneously with the formation of the film having the electro-optic effect thereon.

7. An optical waveguide element, comprising a substrate having an electro-optic effect, and an optical waveguide formed by thermally diffusing a metal element or a metal compound, wherein a diffused concentration of the metal element or the metal compound is substantially symmetrical in vertical directions within a section of the optical waveguide and also substantially symmetrical in lateral directions from a center of the section of the optical waveguide, and the diffused concentration of the metal or the metallic compound decreases outwardly as viewed from the center of the section of the optical waveguide.

8. The optical waveguide element set forth in claim 7, wherein the optical waveguide has an elliptical sectional shape with a ratio a/b of 1 to 10 in which "a" and "b" are a major axis and a minor axis of the elliptical sectional shape.

* * * * *